US008749431B2

(12) United States Patent
 Thill et al.

(10) Patent No.: US 8,749,431 B2
(45) Date of Patent: Jun. 10, 2014

(54) SPACECRAFT POSITION ESTIMATING SYSTEM AND METHOD

(75) Inventors: Marc Thill, Junglinster (LU); Guy Harles, Fentange (LU); Markus Gross, Ottweiler (DE); Jos Wouters, Mamer (LU); Georges Krier, Machtum (LU)

(73) Assignee: SES Astra S.A., Betzdorf (LU)

( * ) Notice: Subject to any disclaimer, the term of this patent is extended or adjusted under 35 U.S.C. 154(b) by 707 days.

(21) Appl. No.: 13/055,163

(22) PCT Filed: Jul. 23, 2009

(86) PCT No.: PCT/EP2009/059483
§ 371 (c)(1),
(2), (4) Date: May 4, 2011

(87) PCT Pub. No.: WO2010/010143
PCT Pub. Date: Jan. 28, 2010

(65) Prior Publication Data
US 2011/0221631 A1    Sep. 15, 2011

(30) Foreign Application Priority Data
Jul. 24, 2008 (EP) .................................... 08013326

(51) Int. Cl.
*G01S 19/00* (2010.01)
(52) U.S. Cl.
USPC .................................................... 342/357.2
(58) Field of Classification Search
USPC .................................................... 342/357.2
See application file for complete search history.

(56) References Cited

U.S. PATENT DOCUMENTS

| | | | |
|---|---|---|---|
| 2,940,076 A | 6/1960 | Bissett et al. |
| 3,060,426 A | 10/1962 | Williams |
| 3,153,237 A | 10/1964 | Lakatos |
| 3,286,263 A | 11/1966 | Hammack |

(Continued)

FOREIGN PATENT DOCUMENTS

| | | |
|---|---|---|
| EP | 1 245 967 A1 | 10/2002 |
| EP | 1 720 033 A2 | 11/2006 |

(Continued)

OTHER PUBLICATIONS

Sonnenschein et al., "Geolocation of Frequency-Hopping Transmitters via Satellite", IEEE Transactions on Aerospace and Electronic Systems, vol. 29, No. 4, Oct. 1993, pp. 1228-1235.

(Continued)

*Primary Examiner* — Harry Liu
(74) *Attorney, Agent, or Firm* — Wolf, Greenfield & Sacks, P.C.

(57) ABSTRACT

A system for estimating a spacecraft (6) position is disclosed. It includes receiving stations (4) for receiving signals transmitted from the spacecraft (6) and a processing station (2) for receiving data from the receiving stations (4). Each receiving station (4) records, during a recording window (8), the signals transmitted from the spacecraft (6) and transmits, to the processing station (2), data representing the recorded signals during the recording window (8). The recording windows (8) associated with each of the receiving stations (4) are offset and/or of different size with respect to each other. The processing station (2) correlates the recorded signals to estimate the distance difference between the spacecraft (6) and each of a plurality of receiving stations and to estimate the spacecraft (6) position. A method, a receiving station (4), a processing station (2) and a computer program are also disclosed.

22 Claims, 7 Drawing Sheets

(56) References Cited

U.S. PATENT DOCUMENTS

| | | |
|---|---|---|
| 3,829,674 A | 8/1974 | Joseph |
| 3,973,258 A * | 8/1976 | Cerni et al. ............... 342/26 R |
| 4,215,345 A | 7/1980 | MacDoran et al. |
| 4,910,526 A * | 3/1990 | Donnangelo et al. ......... 342/455 |
| 5,935,196 A | 8/1999 | Brodie et al. |
| 6,047,192 A | 4/2000 | Maloney et al. |
| 6,104,978 A | 8/2000 | Harrison et al. |
| 6,587,079 B1 * | 7/2003 | Rickard et al. ............... 342/387 |
| 7,339,526 B2 * | 3/2008 | Zimmerman ............... 342/464 |
| 7,925,207 B2 * | 4/2011 | Jung et al. ............... 455/11.1 |
| 2001/0051527 A1 | 12/2001 | Kuwahara et al. |
| 2002/0004398 A1 * | 1/2002 | Ogino et al. ............... 455/456 |
| 2003/0045304 A1 | 3/2003 | Shamoto et al. |
| 2003/0086512 A1 | 5/2003 | Rick et al. |
| 2003/0112183 A1 | 6/2003 | Szajnowski |
| 2004/0140930 A1 | 7/2004 | Harles |
| 2004/0264407 A1 * | 12/2004 | Tang et al. ............... 370/328 |
| 2006/0227043 A1 | 10/2006 | Bay et al. |
| 2007/0115176 A1 * | 5/2007 | Zimmerman et al. ......... 342/465 |
| 2008/0062043 A1 | 3/2008 | Gezici et al. |

FOREIGN PATENT DOCUMENTS

| | | |
|---|---|---|
| FR | 2 902 195 A1 | 12/2007 |
| JP | 05-107330 | 4/1993 |
| RU | 2317643 C2 | 9/2005 |
| WO | WO 97/11383 A1 | 3/1997 |
| WO | WO 02/077662 A1 | 10/2002 |
| WO | WO 02/079800 A1 | 10/2002 |
| WO | WO 03/036820 A1 | 5/2003 |
| WO | WO 2007/113475 A1 | 10/2007 |

OTHER PUBLICATIONS

Manolakis, Dimitris E., "Efficient Solution and Performance Analysis of 3-D Position Estimation by Trilateration", IEEE Transactions on Aerospace and Electronic Systems, vol. 32, No. 4, Oct. 1996, pp. 1239-1248.

Partial European Search Report dated Apr. 14, 2009 from corresponding European Application No. 08013326.7.

Extended Search Report dated Mar. 9, 2010 from corresponding European Application No. 08013326.7.

Office Action issued Apr. 26, 2013 from corresponding Chinese Application No. 200980137639.1.

Office Action mailed Feb. 19, 2013 from corresponding Japanese Application No. 2011-519170.

Office Action dated May 14, 2013 from corresponding Russian Application No. 2011106746.

Office Action dated Sep. 24, 2012 from Chinese Patent Application No. 200980137639.1.

Decision on Grant issued Aug. 16, 2013 from corresponding Russian Application No. 2011106746/07(009591).

* cited by examiner 4 stations range differences plot over 48 hours

B-C range difference plot over 48 hours

Correlation:

Tracking:

SPACECRAFT POSITION ESTIMATING SYSTEM AND METHOD

FIELD OF TECHNOLOGY

The present invention relates to a system for estimating a spacecraft position, and especially for estimating the position of a satellite orbiting the Earth. The invention also relates to a method for estimating a spacecraft position, to a receiving station and a processing station for participating in estimating a spacecraft position, and to a computer program to be executed on a receiving station or on a processing station for participating in estimating a spacecraft position. The invention also relates to the tracking of a spacecraft position.

BACKGROUND

The determination and knowledge of a satellite's orbit at any point in time is of high importance to a satellite operator. The orbit may be derived from position estimations determined by measurements. For example, a geostationary satellite is nominally located (i.e. located according to plan or design) on an assigned longitudinal position on the geosynchronous arc circulating the earth.

Furthermore, a satellite position estimation system allows precise maneuver assessments. Maneuver assessments involve planning and monitoring the impact on the orbit of executed maneuvers, keeping in mind the aim of economically (i.e. sparingly) using the limited amount of fuel onboard a satellite. Maneuvers are notably necessary to keep a geostationary satellite on its assigned longitude. This allows reliable telecommunication reception and transmission via the satellite's non-isotropic antennas. Such maneuvers are necessary since a geostationary orbit is unstable, notably due to the gravitational forces of the Moon and the Sun. Maneuvers are also executed to change the satellite's orbit in a controlled way in order to modify for example its longitudinal position, which is referred to as a satellite drift, as well as its inclination or eccentricity.

In case of a co-location of multiple satellites on a single orbital longitude, a combination of minor longitudinal, inclination and eccentricity separation between the various satellites exists. This scenario is complex and requires continuous and quasi real-time position estimation and orbital determination for each satellite.

Besides geostationary satellites, precise position estimation may be vital and applicable to any type of satellites or spacecraft, whatever their mission type or orbit.

A satellite position may be determined by round trip delay measurements. A round trip delay measurement implies the transmission of a signal from a transmitting ground station to a satellite and back from the satellite to a receiving ground station, and the measurement of the elapsed time between the transmission of the signal from the transmitting ground station and its reception at the receiving ground station. In any of the following methods, the position of each ground station is assumed to be precisely known.

A known method, the so-called trilateration method, involves three ground stations, each able to transmit and receive a reference signal. Typically, each station independently measures the delay between the transmission by itself of a reference signal to the satellite and the reception of the signal back from the satellite after being relayed by the satellite. The set of three stations performing this operation in parallel provides three absolute distance measurements from the three stations to the satellite so that its position is calculable.

Alternatively, the trilateration method can be converted to a pseudo-ranging method. In this method, the round trip delays are not measured independently but jointly between the ground stations such that only one ground station transmits a single reference signal. This first ground station receives the signal back from the satellite. The other stations also receive from the satellite the single reference signal which has being transmitted by the first ground station to the satellite. The distances between the other ground stations and the satellite are therefore calculated indirectly.

The pseudo-ranging method requires a common time reference between the ground stations, whereas the above-described trilateration method does not necessarily require one.

The satellite position estimation may be carried out by solving a three-sphere intersection problem or using an algorithm such as described in D. E. Manolakis: *Efficient solution and performance analysis of 3-D position estimation by trilateration*, IEEE trans. on Aerospace & Electronic Systems, Vol. 32, No. 4, October 1996, pp 1239-1248.

There is a constant need for improving the systems and methods for estimating the position of a spacecraft, such as a satellite.

[Lexical Note]

Before summarizing the invention, the use of the phrase "and/or" herein is explained.

In each instance, the phrase "and/or" is used to indicate that the terms, features, or clauses joined thereby are to be taken together or individually, thus providing three embodiments enumerated or specified. In other words, with A and B being two terms, features, or clauses, the expression "A and/or B" covers three alternative solutions: "A and B", "A", and "B".

When the expression "A and/or B" is used first and then the expression "the A and/or the B" is used (for instance in a claim, or in a claim and one of its dependent claims), this covers five alternative solutions:
first "A and B" and then "the A and the B";
first "A and B" and then "the A";
first "A and B" and then "the B";
first "A" and then "the A"; and
first "B" and then "the B".

Further uses of the phrase "and/or" will be understood in line with these principles, wherein the inconsistent combinations are not covered. For instance, when "A and/or B" is followed by "C and/or D", each expression covers three alternative solutions, thus covering nine alternative solutions. However, for instance, when "C" is a substitute "a property of the A" and when "D" is a substitute "a property of the B", it will be understood that "A and/or B" followed by "C and/or D" covers five alternative solutions only.

SUMMARY

The present invention aims at meeting the above-mentioned need, by improving the systems and methods for estimating a spacecraft position, such as a satellite position.

According to the invention, a system for estimating a spacecraft position is provided. It includes a plurality of receiving stations arranged to receive signals transmitted from the spacecraft, and a processing station arranged to receive data from the plurality of receiving stations. Each of the receiving stations is arranged to record, during a time window, herein referred to as recording window, the signals transmitted from the spacecraft, and to transmit, to the processing station, data representing the recorded signals during the recording window. The recording windows associated with each of the receiving stations are arranged to be offset and/or to be of different size (i.e. different length or duration)

with respect to each other. The processing station is arranged to correlate the recorded signals to estimate, for each of at least one pair among the plurality of receiving stations, the distance difference between the spacecraft and each receiving station of the pair, and, based thereon, the spacecraft position.

Thus, in a first alternative solution, the recording windows associated with each of the receiving stations are arranged to be offset with respect to each other. In a second alternative solution, the recording windows associated with each of the receiving stations are arranged to be of different size with respect to each other. In a third alternative solution, the recording windows associated with each of the receiving stations are arranged to be offset and to be of different size with respect to each other.

This will now be explained in more details. A plurality of receiving stations are arranged to receive radiofrequency signals transmitted from the spacecraft. Each of the plurality of receiving stations records, during a recording window, the radiofrequency signals transmitted from the spacecraft.

Let us consider two of these receiving stations. Each of the two receiving stations records, during a recording window or interval, the radiofrequency signal sequence coming from the spacecraft over the air interface. The start and end of the recording window are known with reference to a time reference common to the two receiving stations. Next, the radiofrequency signal sequences recorded at the two receiving stations are both transmitted to the processing station. The information about the start and end of the recording window corresponding to the radiofrequency signal sequence transmitted from each of the two receiving stations is either a priori known by the processing station or transmitted by the receiving stations to the processing station. No information about when the radiofrequency signal sequence was transmitted from the spacecraft is required at the processing station. Likewise, no information about the radiofrequency signal sequence nature is required at the processing station. The processing station determines, with reference to the known common time basis, the time difference of arrival (TDOA) of the portion of the radiofrequency sequence which has been received and recorded at the two receiving stations during the two respective recording windows.

The time difference of arrival of the radiofrequency sequence at the first and second receiving stations corresponds to the difference of distance between the spacecraft and the first receiving station and between the spacecraft and the second receiving station. This time difference, or shift, is determined by correlating, at the processing station, the two radio frequency signal sequences. The correlation peak corresponds to the time difference, or shift.

By correlating the pair of recorded radiofrequency sequences, received at the first and second receiving stations, the difference in distance between the spacecraft and the first and second receiving stations may be determined, considering the properties of the propagation medium. Within the recording windows corresponding to the pair of recorded radiofrequency sequences, there should be an overlap interval during which the same portion of the original radiofrequency sequence transmitted from the spacecraft has been received at the first and second receiving stations. The spacecraft is located on the two-sheeted hyperboloid corresponding to the set of points in space for which the difference of distance between the spacecraft and the first and second receiving stations is constant.

By repeating the same process at the same point in time, or substantially at the same point in time, for a second pair of receiving stations, and, if necessary, for a third pair of receiving stations, two other hyperboloids on which the spacecraft can be located may be determined. The spacecraft may be estimated to be at the intersection of these hyperboloids.

As explained above, recorded signals are correlated by pair at the processing station. The identification of the intersection of the hyperboloids provides an estimation of the spacecraft position. This process, also known as three-dimensional hyperbolic positioning, requires transmission of the actual recorded signal sequences to a processing station. In addition, the signal sequences should be recorded over a sufficiently long recording window to obtain a significant correlation peak. The correlation processing gain is derived from the available signal bandwidth multiplied by the sampling time.

This method is advantageous in that a reference signal pattern, either on the physical layer or encapsulated in modulated payload, is not required to be sent from the spacecraft. The method neither requires any trigger sequence emitted by the spacecraft in order to enable the recording at the receiving stations. Furthermore the spacecraft is not required to be specially adapted. In this sense, the method is passive. It does not require a cooperating spacecraft. The spacecraft is only required to send some electromagnetic signals which may be detected by the receiving stations. This being said however, the method is able to cope with and to make use of reference signal patterns and trigger sequences emitted by the spacecraft to enable the recording at the receiving stations.

When designing such a method and system, a need occurs for the transmission of recorded signal sequences corresponding to recording windows having a sufficient length to take into account the difference in distance between the spacecraft and each of the first and second receiving stations while still including a sufficient time overlap with respect to the originally transmitted sequence to provide significant correlation. It has now been recognized that implementing a method or system satisfying such a need may considerably increase the load on the communication links between each of the receiving stations and the processing station.

It has been further recognized that this is especially the case when spacecraft position tracking is carried out, which requires a succession of frequent position estimation in order for instance to properly and timely control a maneuver. Locating the receiving stations far apart from each other (for instance separated by more than 500 kilometers) is preferred to increase the process angular resolution and the spacecraft position estimation precision. The distances between each of the receiving stations and the processing station may therefore be large so that there is no line-of-sight between the receiving stations and the processing station. This further increases the network load caused by the transmission of the recorded sequences.

By offsetting, in an intentional and controlled manner, the recording windows, the amount of data to be transmitted to the processing station is reduced. In addition or alternatively (thus providing three alternative solutions), by setting, in an intentional and controlled manner, the size of each recording window individually, so that the recording windows are arranged to have a different size with respect to each other, the amount of data to be transmitted to the processing station is also reduced. Rather than recording the received signal sequences during the same recording window (same with respect to a common time reference) at each of the receiving stations, the recording windows are offset and/or their size is differently set with respect to each other. How the offsets between the recording windows and/or the individual size of each window may in some embodiments be calculated will be apparent from the detailed description of the specific embodiments, with reference to the drawings (for instance FIG. 3b).

The ranging system disclosed in US 2004/0140930 A1 (herein referred to as "ref. [1]") is also concerned in estimating a spacecraft position. It is interesting to highlight the differences between ref. [1] and the system and method of the invention, to better understand the invention. In the system of ref. [1], the distances between a spacecraft and each of at least three receiving stations is determined at the receiving stations. The determined distance values are sent to a central processing station, and the spacecraft position is estimated based thereon. The estimation is based on a trilateration calculation on the distance values.

In one embodiment of ref. [1], as illustrated in its FIG. 6, a transmitting station (numeral 605 in FIG. 6) and a receiving station (numeral 613 in FIG. 6) are jointly used to provide a round-trip delay (difference between an emission time and a reception time) providing one distance measurement.

The invention notably differs from ref. [1] in that, in the invention, the actual recorded signals at two receiving stations are sent to a processing station to be correlated there by pairs. In addition, the invention uses controlled time offsetting between recording windows and/or individual size setting of the recording windows at each receiving station to reduce the load on the network caused by the transmission of the recorded signals. Offsetting and/or setting the size of recording windows is neither disclosed nor even needed in ref. [1]. The problem of reducing the load on the network caused by the ranging system does not arise in ref. [1], since the actual received and recorded signals are not sent on the network to a central processing station in order to calculate the time difference of the signal copies recorded at the receiving stations. Only distance values and time stamps are sent (e.g. one of an emission time and a reception time in FIG. 6 of ref. [1]).

In the above-described embodiment of the invention, the recording windows are arranged to be offset in time and/or to differ in size with respect to each other. As a skilled person will recognize it, this does not exclude an occasional time offset which would be close to the value "0" between two recording windows (e.g. the offset between the start of two recording windows). Likewise, this does not exclude an occasional almost equal size between two recording windows. The aspect of the invention, consisting in that the recording windows are arranged to be offset in time and/or to differ in size with respect of each other, reflects the capacity, from a configuration perspective, of the positioning system to offset and/or to individually vary the size of the recording windows, intentionally and in a controlled manner, in order to reduce the amount of data to be transmitted to the processing station. The intentional and controlled offsetting and/or size setting is based on an a priori knowledge of the difference in distance between a first receiving station and the spacecraft and a second receiving station and the spacecraft.

The offset associated with a pair of receiving stations is an offset with respect to a common time reference. In one embodiment, the receiving stations are provided with clocks synchronized with each other.

In one embodiment, some of the receiving stations are not synchronized in time with respect to each other. The components and structure of some of the receiving stations may also differ, thus causing time offset with respect to each other due to the station individual inherent delays. The amount of de-synchronization between the receiving stations is known by the processing station, so that the processing station is capable of sending meaningful offset commands (meaningful from a time reference perspective). In other words, even if there is no time synchronization and/or if there are difference in components and structure between receiving stations, insofar as the processing station knows the extent of time de-synchronization or components and structure differences between the receiving stations, the processing station may take the de-synchronization and components and structure differences into account to properly generate window offset and/or size commands (or trigger commands) to the receiving stations and properly process the results (recorded data) for meaningful correlation.

The problems solved by the invention are significant for the determination of a spacecraft position and do not directly apply (or at least are very difficult to apply) to the determination of an airplane position, such as in the context of air traffic control. In air traffic control, the receiving stations are only located several kilometers apart (more than 50 kilometers), often having a line-of-sight in between the receiving stations and the central processing station. Furthermore, the airplane's instantaneous position may be anywhere in the geographical zone covered by the reception radius of the receiving stations. In addition, the airplane's trajectory may be highly dynamic and unpredictable, in altitude or direction. Offsetting and varying the size of recording windows solve problems which are proper to spacecrafts, and especially geostationary satellites. This is linked to the geometry of the receiving stations (located far apart from each other, preferably more than 500 kilometers) and to the fact that the satellites are on a geosynchronous or quasi-geosynchronous orbit 36000 kilometers above the earth surface (wherein the position of the satellite can be fairly well predicted). Due to the significant distances between the receiving stations and the satellite, the times of arrival of a satellite signal differ much more in time than the net window size required to obtain a good correlation peak. Offsetting and/or varying the size of recording windows optimizes the window size overhead, and addresses the issue of transferring large amount of data to a central processing station.

In a particular embodiment, the spacecraft is restricted to be in a specific "box". The box may be the quasi-geosynchronous arc and thus limits where the spacecraft can be located and directly translates this into the differences in distance between the receiving stations and the spacecraft and into the window size and time offset for the different receiving stations.

In one embodiment, one of the receiving stations is co-located with the processing station.

In one embodiment, the data transmitted from the receiving station to the processing station are digitalized for transmission. This increases system reliability.

In one embodiment, the correlation, by the processing station, includes correlating pairs of recorded signals, detecting the correlation peak position representing the time shift between the two copies, calculating the three-dimensional hyperbole or two-sheeted hyperboloid corresponding to each pair, and calculating the intersection of the hyperboles which is the spacecraft location. To cope with cases wherein the intersection of more than two hyperboloids does not lead to a single point, the calculation may include an optimization, including for instance a least square method, to find the closest (most likely) intersection point and thus the position.

In one embodiment, the correlation, by the processing station, includes correlating pairs of recorded signals, detecting the correlation peak position representing the time shift between the two signal copies, Calculating the resulting differences in signal runtimes from the satellite to the respective receiving stations with known positions. This data is provided to a separate system calculating the spacecraft location.

In one embodiment, the clocks of each of the plurality of receiving stations are synchronized.

In one embodiment, the offset between the recording windows associated with two receiving stations and/or the respective size of the recording windows is arranged to be calculated based on information on the position of the spacecraft and the position of the two receiving stations. The time offset and/or window sizes may be calculated by the processing station.

In one embodiment, the respective window size and/or time offset between the recording windows associated with two receiving stations is arranged to be a priori known by the respective receiving stations and does not need to be provided by the processing station.

In one embodiment, the system does not only serve to estimate the spacecraft position but also to track its position over time. In this embodiment, the offset between the recording windows associated with two receiving stations is arranged to be calculated based on, or based further on (if the offset is already calculated based on a knowledge, beforehand, of the spacecraft position), information on the spacecraft position as estimated by the processing station itself (in one or more previous operational steps).

In one embodiment, tracking the spacecraft position over time is managed by each receiving station independently by using a priori information represented by window offset and/or size setting predictions and does not need to be provided by the processing station.

A tracking or feedback loop may be provided as follows. Based on knowledge of the spacecraft position obtained beforehand or the difference in distance between the receiving stations and the spacecraft (the spacecraft position is not necessarily needed, the range/time difference for the receiving station pair is sufficient for the feedback loop, so that the process works also isolated for one single receiving station pair), and based on the predetermined knowledge of the position of the receiving stations, the processing station transmits window offset and/or size setting commands to the receiving stations.

The term "range" refers herein to the distance between the spacecraft (or, in one embodiment, satellite) and a receiving station.

Each receiving station records, based on the window offset and/or size setting command received from the processing station, the signal sequence received from the spacecraft, and the sequence is sent to the processing station. The processing station receives newly recorded signal sequences. It re-computes, i.e. updates, the spacecraft position estimation, recalculates the difference in distance between the receiving stations and the spacecraft, and finally, calculates new window offsets and/or window sizes to be transmitted. The tracking loop is then executed again. The system and method enables to significantly reduce the amount of data to be transmitted on the communication links between the receiving and processing stations.

The recording window sizes may be adapted and controlled by the processing station, notably based on the degree of precision as to the a priori knowledge of the spacecraft position. In this embodiment, the processing station does not only send offset commands to the receiving stations, but also window size commands. The offset command determines the start of the recording window and the size command its size. In one embodiment, the recording window sizes are not adapted but are rather determined in advance, to take into account all or most of the unknown time-related parameters of the system, including for instance the time variances caused by the satellite radial movement over a day or after a maneuver or the delay variations introduced by the atmosphere.

Tracking the satellite position and efficiently making use of past position knowledge to determine the offsets, and optionally the recording window size, are closely interrelated.

In one embodiment, the tracking is carried out in real-time. "Real-time" means here with operational deadlines as to the system response to allow quick and successful maneuver assessment. Real-time tracking and position control may be critical for position control and maneuvers using satellite on-board engine(s).

In one embodiment, a rate of one recording operation per second is used at the receiving stations and one resulting position estimation for tracking. In one embodiment, a rate comprised between one recording operation per 0.1 seconds and one recording operation per 24 hours is used for tracking.

When using window tracking, the location of the correlation peak is detected and the windows are offset to maximize their respective overlap in content for the next iteration, so as to therefore track the time difference between the signals. Satellites allow position prediction for such a tracking, since they are typically subject to relatively slow and constant movements over time, relative to the receiving stations.

In one embodiment, wherein tracking is used, the offset is arranged to be calculated between a first recording operation and a second recording operation based on the estimated spacecraft position derived from the first recording operation. The first and second recording operations may be for instance separated by 0.1 seconds to 12 hours. The first and second recording operations may be two successive recording operations.

In one embodiment, at least one of the receiving stations is located outside the main lobe downlink footprint of the spacecraft. This configuration is particularly well adapted to estimate the position of a spacecraft which uses a non-isotropic or directional antenna with a narrow radiation beam pattern to communicate towards a limited area on earth, while at the same time allowing receiving stations to be sufficiently far apart from each other to provide a good angular resolution to determine the spacecraft position. The further the receiving stations are from each other, the better is the resolution.

This may be further explained as follows. The system is based on correlating recorded signals. Thus, due to the inherent processing gain of the correlation technique, signals with low or negative S/N (signal-to-noise) ratio may be used in the correlation process as the correlation gain is primary determined via the product of the signal bandwidth multiplied by the sampling time of the recording windows. The correlation gain is therefore used to compensate the low or negative S/N ratio of the individual signals and the correlation may still provide a significant peak.

In one embodiment, each recording window has a sufficiently small duration so that the Doppler effect, the effects of the atmosphere (which may cause distortions) and the imperfections of the receiving front ends of the receiving stations have no significant impact on the correlation by the processing station or, in other words, so that the correlation processing is not significantly affected by frequency shifts caused by the Doppler effect, the atmosphere-induced distortions and the receiving stations' front end imperfections.

In one embodiment, at least one of the recording windows has a size comprised between 4 microseconds and 10 milliseconds. In one embodiment, each of the recording windows has a size comprised between 4 microseconds and 10 milliseconds. These embodiments provides, for spacecraft applications, a good compromise between having a sufficiently long recording window to obtain a significant correlation peak and having a sufficiently short recording window to reduce the load on the communications links between the receiving and processing stations.

In one embodiment, the position of a non-geostationary satellite is estimated.

In one embodiment, the data sent from a receiving station to the processing station contains any form of timing information regarding the window.

The invention also relates to a method for estimating a spacecraft position using a plurality of receiving stations arranged to receive signals transmitted from the spacecraft and a processing station arranged to receive data from the plurality of receiving stations. The method includes a recording and transmitting procedure and a correlation procedure. The recording and transmitting procedure includes recording, by each of the receiving stations, during a recording window, the signals transmitted from the spacecraft and transmitting, by each of the receiving stations, to the processing station, data representing the recorded signals during the recording window. The recording windows associated with each of the receiving stations are offset and/or are of different size (i.e. length or duration) with respect to each other. The correlating procedure includes correlating, by the processing station, the recorded signals to estimate, for each of at least one pair among the plurality of receiving stations, the distance difference between the spacecraft and each receiving station of the pair, and, based thereon, the spacecraft position.

The invention also relates to a receiving station for participating in estimating a spacecraft position. The receiving station comprises a first receiver, a second receiver, a recorder, and a transmitter. The first receiver is arranged for receiving signals transmitted from the spacecraft. The second receiver is arranged for receiving from a processing station a trigger time indication as an instruction to start a recording window and/or a window size indication as an instruction to the size of the recording window. The recorder is arranged for recording, during a recording window started according to the received trigger time indication and/or the window size indication, the signals transmitted from the spacecraft. The transmitter is arranged for transmitting, to the processing station, data representing the recorded signals during the recording window.

The invention also relates to a processing station for participating in estimating a spacecraft position. The processing station comprises a transmitter, a receiver and a correlator. The transmitter is arranged for transmitting, to each of a plurality of receiving stations arranged to receive signals transmitted from the spacecraft, a trigger time indication referring to the start of a recording window, and/or a window size indication as an instruction to the size of the recording window. The receiver is arranged for receiving, from each of the plurality of receiving stations, data representing recorded signals transmitted from the spacecraft during the recording window. The recording windows associated with each of the receiving stations are arranged to be offset and/or to be of different size with respect to each other. The correlator is arranged for correlating the recorded signals to estimate, for each of at least one pair among the plurality of receiving stations, the distance difference between the spacecraft and each receiving station of the pair, and, based thereon, the spacecraft position.

The invention also relates to a computer program configured, when executed on a receiving station or on a processing station, to carry out respectively the receiving station specific procedures or the processing station specific procedures of the above-described method of the invention.

BRIEF DESCRIPTION OF THE DRAWINGS

Embodiments of the present invention shall now be described, in conjunction with the appended Figures in which.

DETAILED DESCRIPTION

The present invention shall now be described in conjunction with specific embodiments. It may be noted that the specific embodiments serve to provide the skilled person with a better understanding, but are not intended to in any way restrict the scope of the invention, which is defined by appended claims. In particular, the embodiment described independently throughout the description can be combined to form further embodiments to the extent that they are not mutually exclusive.

Figure 1:
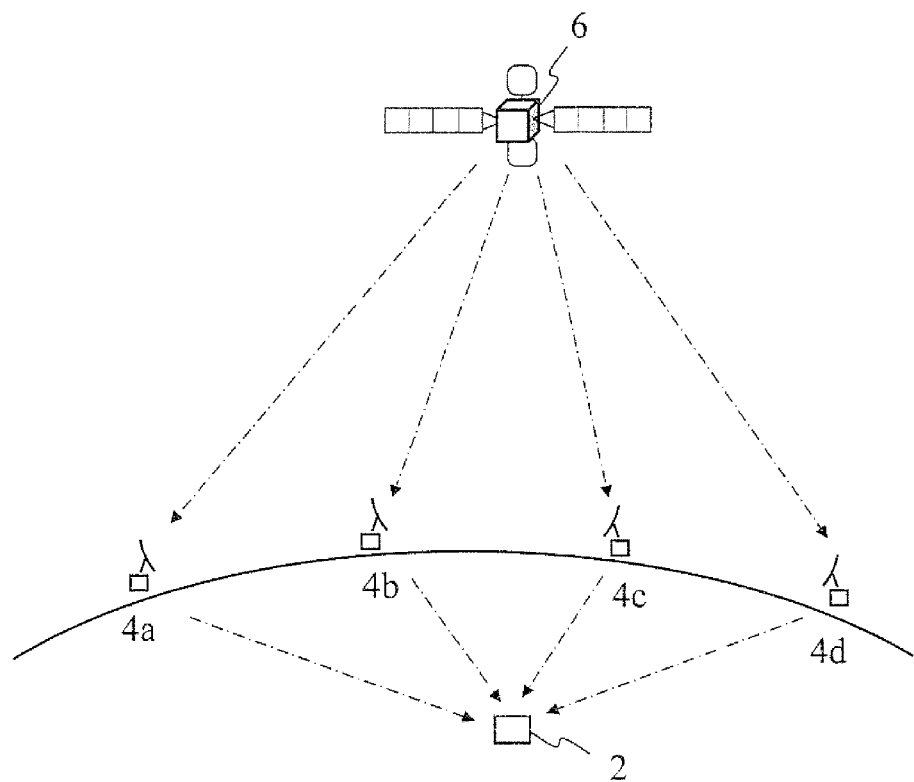
FIG. 1 schematically illustrates a system according one embodiment of the invention, with, at the bottom of the figure, window offsetting and individual window size setting.
Figure 1:
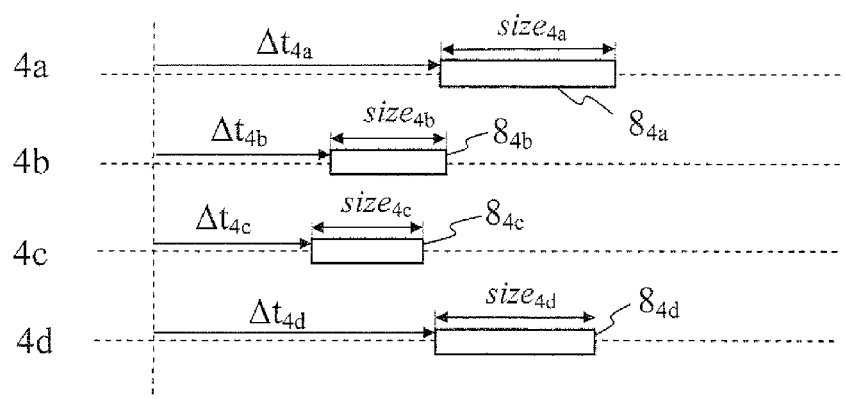

FIG. 1 schematically illustrates a spacecraft 6, receiving stations 4a, 4b, 4c, 4d located on the surface of the Earth at distinct positions, and a processing station 2, according to one embodiment of the invention. The spacecraft 6 emits a radiofrequency signal towards the receiving stations, as illustrated by the dashed arrows originating from the spacecraft 6. The radiofrequency signals transmitted from the spacecraft 6 are received at the receiving stations 4a, 4b, 4c, 4d.

The receiving stations 4a, 4b, 4c, 4d record, each during a specific recording window $8_{4a}$, $8_{4b}$, $8_{4c}$, $8_{4d}$, the received radiofrequency signal sequences. The nature or content of the signal sequences are not known in advance by the receiving stations 4a, 4b, 4c, 4d and there is therefore no correlation carried out at the receiving stations between the received signal sequences and a predetermined sequence or a known pattern. No dedicated ranging signal, digital bit sequence nor recording trigger sequence are required to be sent by the spacecraft 6. Any payload or communication channel signal radiated by the spacecraft 6 may be used for the estimation process, including relayed digital or analogue payload signals, telemetry beacons or transponder tube noise.

The received signal sequences are transmitted from the receiving stations 4a, 4b, 4c, 4d to the processing station 2. The signal sequences may be digitalized for transmission.

As schematically illustrated at the bottom of FIG. 1, each of the receiving stations 4a, 4b, 4c, 4d is arranged to record the received signals during a recording window $8_{4a}$, $8_{4b}$, $8_{4c}$, $8_{4d}$ respectively. With respect to a common instant (as illustrated by the vertical dashed line at the bottom left of FIG. 1), the recording windows $8_{4a}$, $8_{4b}$, $8_{4c}$, $8_{4d}$ are respectively offset by an offset $\Delta t_{4a}$, $\Delta t_{4b}$, $\Delta t_{4c}$, $\Delta t_{4d}$ (wherein $\Delta$ is the Greek letter delta and denotes here an offset). Therefore, the offset between the recording windows $8_{4a}$, $8_{4b}$ of the pair of receiving stations 4a, 4b is equal to $$\Delta t_{4b} - \Delta t_{4a},$$

and is a negative value in the exemplary illustration of FIG. 1. The offset between the start of the recording windows $8_{4b}$, $8_{4c}$ of the second pair of receiving stations $4b$, $4c$ is equal to $$\Delta t_{4c} - \Delta t_{4b},$$

and is a negative value in the exemplary illustration of FIG. 1. Finally, the offset between the recording windows $8_{4c}$, $8_{4d}$ of the third pair of receiving station $4c$, $4d$ is equal to $$\Delta t_{4d} - \Delta t_{4c},$$

and is a positive value in the exemplary illustration of FIG. 1.

The sizes of the recording windows $8_{4a}$, $8_{4b}$, $8_{4c}$, $8_{4d}$ are respectively $size_{4a}$, $size_{4b}$, $size_{4c}$, $size_{4d}$. The sizes may be set individually for each recording window 8 and may therefore be different from each other, as illustrated. The use of different window sizes associated with the receiving stations 4 reduces the maximum overlap in content of the recording windows 8 for the correlation process.

FIG. 1 illustrates the use of both window offsetting and individual size setting. The use of only one of these two techniques is also possible.

The number of receiving stations is not limited to four. If a priori information is available regarding the position of the spacecraft, the spacecraft positioning system may include one pair of receiving stations only, or two pairs of receiving stations only. Likewise, more than three pairs of receiving stations forming more than four receiving stations may be used to increase the estimation accuracy.

The signal sequences recorded at the receiving stations $4a$, $4b$, $4c$, $4d$ are sent to the processing station 2, wherein the correlation by pair is carried out. The next offset to be used for the recording windows at each of the receiving station 4 may also be determined.

The determination of the position of the spacecraft 6 is based on time difference of arrival (TDOA; at the respective receiving stations located on known positions on the earth) computation. It can be visualized and mathematically solved as the determination of the intersection of two-sheeted hyperboloids. Each hyperboloid is obtained by identifying a correlation peak associated with a pair of receiving stations 4, as described above. The determination of the intersection of two-sheeted hyperboloids to estimate the spacecraft position may be performed by solving a system of nonlinear equations. In the event that no solution to a system of nonlinear equations can be found, the optimal or closest solution in terms of the least square method or the like may be selected as the spacecraft position.

The information on the satellite position may be provided on a computer screen (not illustrated) to assist a user in determining whether a maneuver should be performed or whether a maneuver has been executed as predicted, or in calculating the orbit of the spacecraft. The information on the satellite position may be in any form, including a visualization or mathematically expression. Furthermore, the information on the satellite position and/or on the differences in distance between the spacecraft and the plurality of receiving stations may be provided in any form to any other system using the information as input to a process integrated with or decoupled from the system of the invention.

Figure 2:
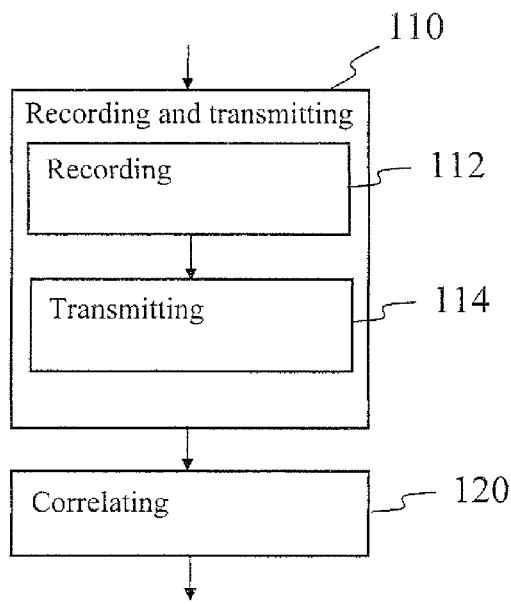
FIGS. 2, 3a and 3b schematically illustrate methods according to embodiments of the invention.

FIG. 2 illustrates a method according to one embodiment of the invention. The method includes a recording and transmitting procedure 110 including recording 112, by each of the receiving stations 4 during a recording window 8, the signals transmitted from the spacecraft 5 and transmitting 114, by each of the receiving stations 4 to the processing station 2, data representing the recording signals which have been recorded during the recording window 8. As explained above, the recording windows 8 associated with each of the receiving stations 4 are offset and/or of different size with respect to each other.

The method also includes a correlating procedure 120 including correlating, by the processing station 2, the recorded signals to estimate the distance difference between the spacecraft 6 and each one of the receiving stations 4 of a pair of receiving stations 4 (and so on, similarly, for other pairs of receiving stations, if any), and, based thereon, the spacecraft position. The correlation is performed by pair to identify a correlation peak. The position, in time, of the correlation peak, taking due account of the intentionally defined offset, correspond to the time difference of arrival between the spacecraft 6 and each one of the pair of receiving stations 4, and thus also to the distance difference between the spacecraft 6 and each one of the pair of receiving stations 4.

The method does not require the actual distance between a receiving station 4 and the spacecraft 6 to be known as an input to the position estimation process. The method neither requires any information regarding the transmission time of the signals from the spacecraft 6 nor any information regarding the nature of the signals transmitted from the spacecraft 6 to be known as an input to the position estimation process.

Figure 3A:
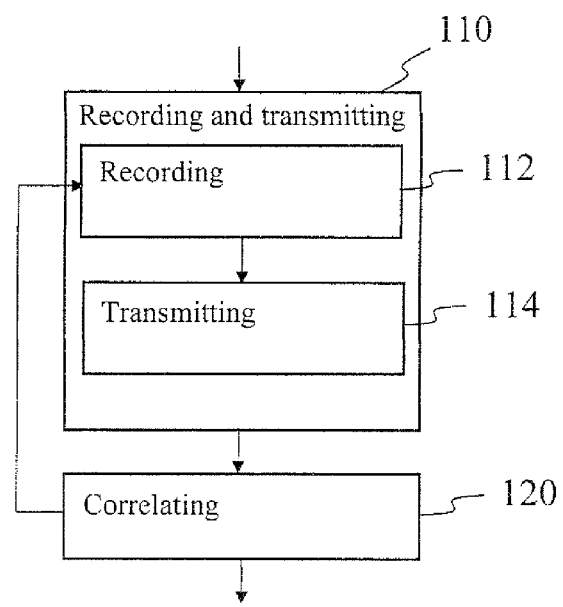

FIG. 3a illustrates a method according to one embodiment of the invention. It differs from the method of FIG. 2 in that, as a result of the correlating procedure 120, not only information about the spacecraft position and/or on the differences in distance between the spacecraft and the plurality of receiving stations is obtained, but also new offset and/or window size commands are computed and sent from the processing station 2 to the receiving stations 4. Therefore, the offset between the recording windows associated with two receiving stations 4 and/or the window size of the recording windows is calculated based on information on the position of the spacecraft 6 (and the known position of the two receiving stations 4).

Figure 3B:
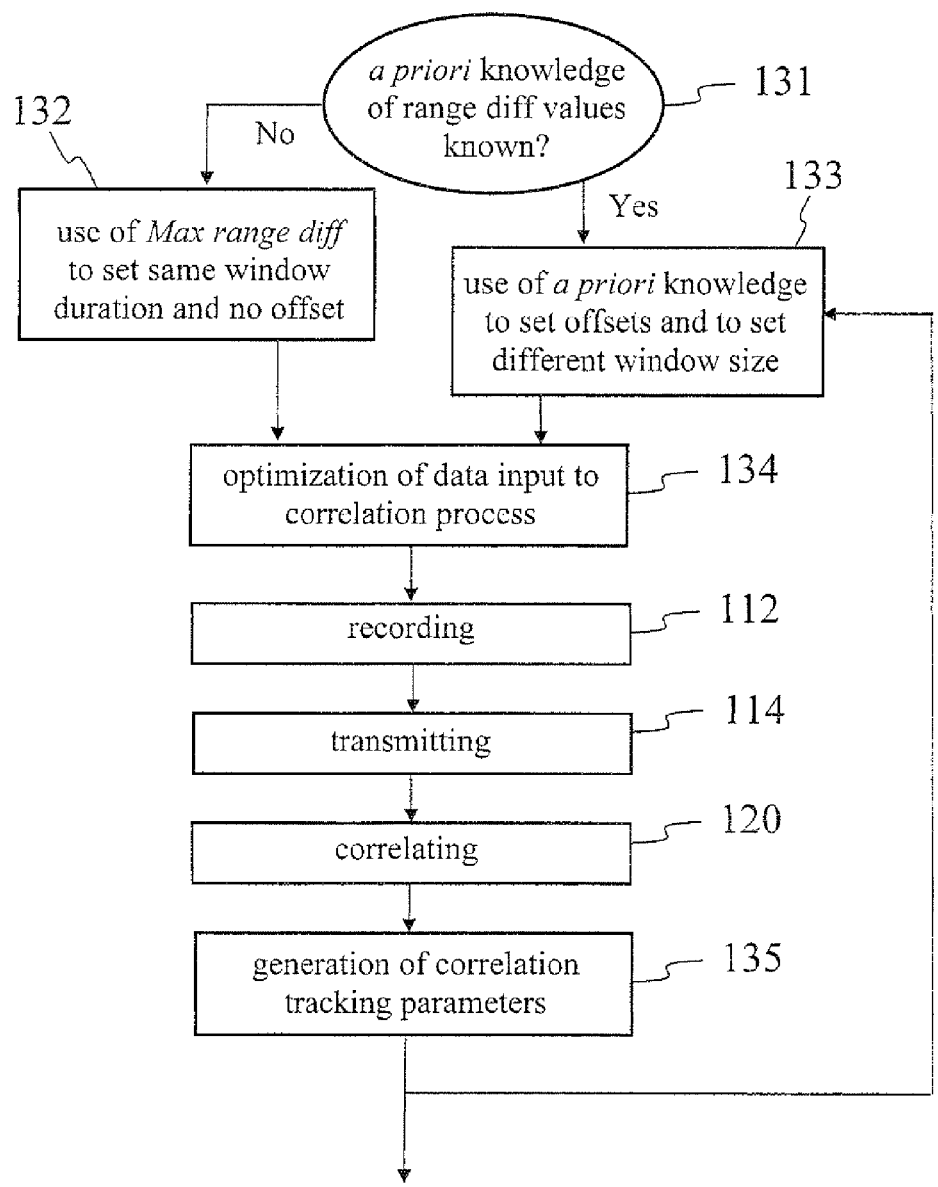

The time offsetting of the recording windows 8 and the setting of their size will now be explained with reference to FIG. 3b in the context of a method according to another embodiment, including position tracking. The offset and size parameters are iteratively adapted. FIG. 3b shows the feedback loop and illustrates innovative steps of offsetting, size setting (i.e. setting the size of the individual windows) and tracking.

Let us now consider two receiving stations $4a$, $4b$ and their corresponding recording windows $8_{4a}$, $8_{4b}$. The size of the recording windows $8_{4a}$, $8_{4b}$ may be both set to be sufficiently large to cover the maximal range difference associated with each one of the receiving stations $4a$, $4b$ (said range being herein referred to as "Max range diff A–B") plus an overhead. The difference Max range diff A–B is equal to the ground baseline distance between receiving stations $4a$ and $4b$. If more receiving stations $4a$, $4b$, $4c$, $4d$ are used, the window size has to take into account the largest range difference, for instance Max range diff C–D. If no a priori knowledge of range difference values is known 131 ("No"), setting 132 as the size of the recording windows $8_{4a}$, $8_{4b}$, $8_{4c}$, $8_{4d}$ the same Max range diff C–D may be used as initial values (but not throughout the tracking process).

A priori knowledge of range difference values may be derived from any one of or any combination of:
    satellite orbit predictions (Keplerian elements),
    information of the longitude of the satellite located on the geostationary arc,
    information of the approximative position (in a box) of the satellite on the geostationary arc, information derived from any (past) measurements (e.g. antenna pointing), information derived from past correlations (which becomes a priori knowledge in the context of the current iteration).

If a priori knowledge of range difference values is known 131 ("Yes"), this may be used to set 133 the size of the recording windows 8 and time offsets between the recording windows 8. If no a priori knowledge is available, no offset is set.

The optimization 134 of data input to correlation process may then take place. This may include:

a) Scaling of the window size associated with the receiving station 4a to the minimum required to get a sufficient correlation peak (available signal bandwidth multiplied by sampling time or "BW*t product").

b) Selection of the window size associated with the receiving station 4b to match the range difference prediction accuracy obtained in step 133.

The recording 112, transmitting 114 and correlation 120 of the signal sequences recorded during the recording window $8_{4a}$ and $8_{4b}$ then take place. The correlation 120 involves the correlation peak position detection. The range difference is the sum of the correlation peak position and the window offset (if any) as set in step 133.

The generation 135 of correlation tracking parameters may then take place. Once the peak position is found, the size of the recording window $8_{4b}$ may be reduced to remove the overhead bearing no relevant content for the correlation with recording window $8_{4a}$. The size of the recording window $8_{4b}$ may be reduced up to the size of window $8_{4a}$. It is however preferred to keep some margin in recording window $8_{4b}$'s size, to compensate for the spacecraft or satellite movement over time until the upcoming recording iteration. The range difference calculated in step 120 provides an updated "window offset" parameter value. The size calculated in step 135 provides an updated "window size" parameter value. These new values may then be used in the next iteration(s), either on the same set of data, or on a second set of data recorded later in time ("tracking"). The use of the generated parameter values in the next iteration(s) is illustrated by the arrow originating from the bottom of FIG. 3b, after box 135, and leading to box 133.

Tracking may make use of one previous measurement, or several previous measurements corresponding to several iterations.

Figure 4:
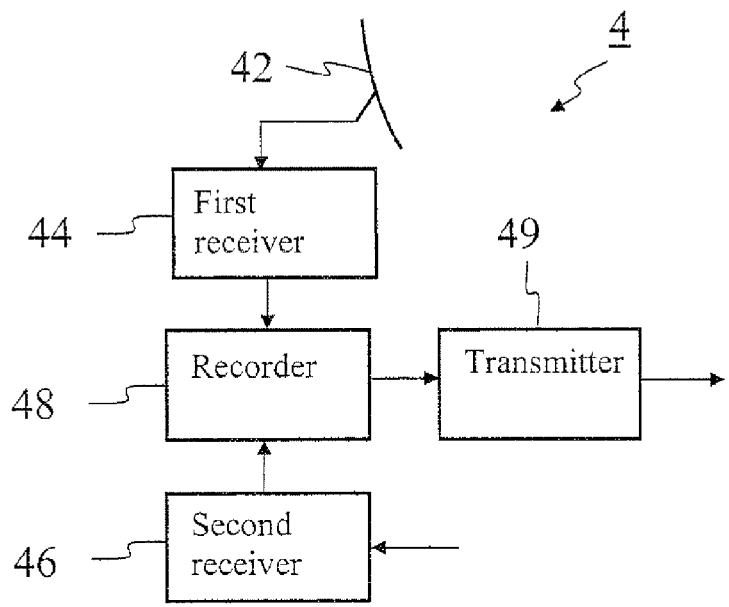
FIG. 4 schematically illustrates a receiving station according to one embodiment of the invention.

FIG. 4 illustrates a receiving station 4 according to one embodiment of the invention. The receiving station 4 participates in estimating the position of a spacecraft 6. To do so, it cooperates with a processing station 2. The receiving station 4 includes an antenna 42 or antenna unit 42, a first receiver 44 or first receiving unit 44, a recorder 48 or recording unit 48, a transmitter 49 or transmitting unit 49, and a second receiver 46 or second receiving unit 46.

The antenna 42 is configured for receiving signals from a spacecraft 6, the position of which is to be estimated. The antenna 42 is connected to a first receiver 44 arranged for receiving the signals transmitted from the spacecraft 6 through the antenna 42. A second receiver 46 is arranged for receiving, from a processing station 2, a trigger time indication (corresponding to a time offset) as an instruction to the start of a recording window 8 and/or a window size indication (corresponding to a duration) as an instruction to the size of the recording window 8. The recorder 48 is arranged for recording, during a recording window 8 started in accordance with the trigger time indication and/or window size indication received from the processing station 2, the signals transmitted from the spacecraft 6. The recorder 48 may be adapted to activate an analogue-to-digital converter in accordance with the trigger time indication received from the processing station 2, at the time indicated by the trigger time indication, so as the record the signal during the recording window 8. The triggering of the analogue-to-digital converter may be performed based on a provided synchronized time basis (synchronized among the receiving stations 4).

The transmitter 49 is arranged for transmitting, to the processing station 2, data representing the recorded signals during the recording window 8.

Figure 5:
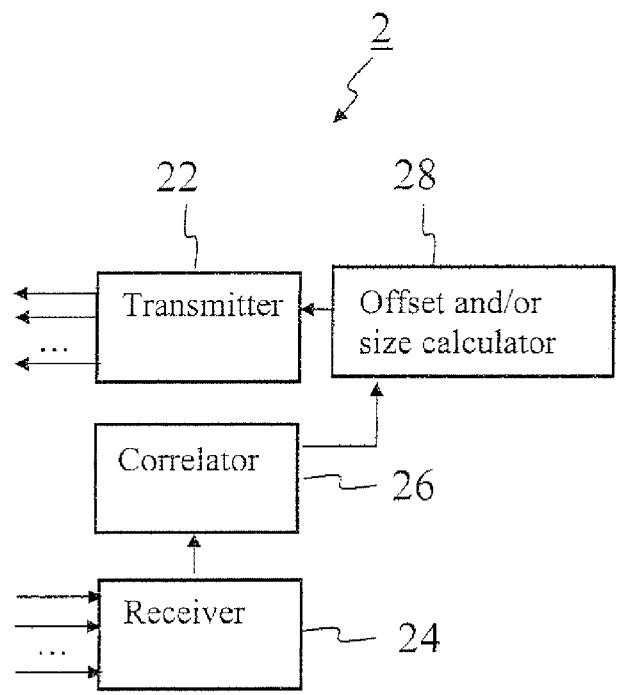
FIG. 5 schematically illustrates a processing station according to one embodiment of the invention.

FIG. 5 illustrates a processing station 2 according to one embodiment of the invention. The processing station 2 participates in estimating the position of a spacecraft 6. To do so, it cooperates with receiving stations 4. The processing station 2 comprises a transmitter 22 or transmitting unit 22, a receiver 24 or receiving unit 24 and a correlator 26 or correlating unit 26. The transmitter 22 is arranged for transmitting, to each of a plurality of receiving stations 4 arranged to receive signals transmitted from the spacecraft 6, a trigger time indication referring to the start of a recording window 8, and/or a window size indication as an instruction to the size of the recording window 8. In other words, the trigger time indication is an instruction to a receiving station 4 to start recording the signals received from the spacecraft 6. The window size indication is an instruction to a receiving station 4 to record the signals received from the spacecraft 6 during the window size. The size of the recording window 8 may be a default value set within the receiving stations 4 (for instance within its memory unit) or may be sent by the processing station 2 as an instruction to the receiving stations 4. The recording window size may also be adapted to take the a priori knowledge of the position of the spacecraft 6 into account.

The receiver 24 is arranged for receiving, from each of the plurality of receiving stations 4, data representing recorded signals transmitted from the spacecraft 6 during the recording window 8. The recording window 8 associated with each of the receiving stations 4 are arranged to be offset and/or to be of different size with respect to each other. The correlator 26 is arranged for correlating the recorded signals to estimate the spacecraft 6 position. The estimation of the spacecraft position is performed by the correlator 26 in accordance with above-described three-dimensional hyperbolic positioning method.

An offset and/or size calculator 28, or offset and/or size calculating unit 28, is provided for calculating offsets and/or window sizes associated with the recording windows 8 of each of the receiving stations 4 based on the spacecraft position and/or on the differences in distance between the spacecraft and the plurality of receiving stations calculated using the information obtained from the correlator 26.

Further advantages provided by embodiments of the invention include:

No round-trip delay measurements required, and no need for any dedicated ranging signal uplink arrangements;

No knowledge required of the uplink conditions (link from the receiving stations to the spacecraft 6) with respect to timing, load, queuing, access and so on;

No time-stamping of transmitted signals required by the satellite transmitting unit;

No decoding nor demodulating required at the receiving stations, thus reducing the delays introduced by the receiving stations 4 before associating the recorded sequence with timing information and sending the recorded signals to the processing station 2 (downconversion and analogue-to-digital (A/D) conversion may however be carried out).

Figure 6:
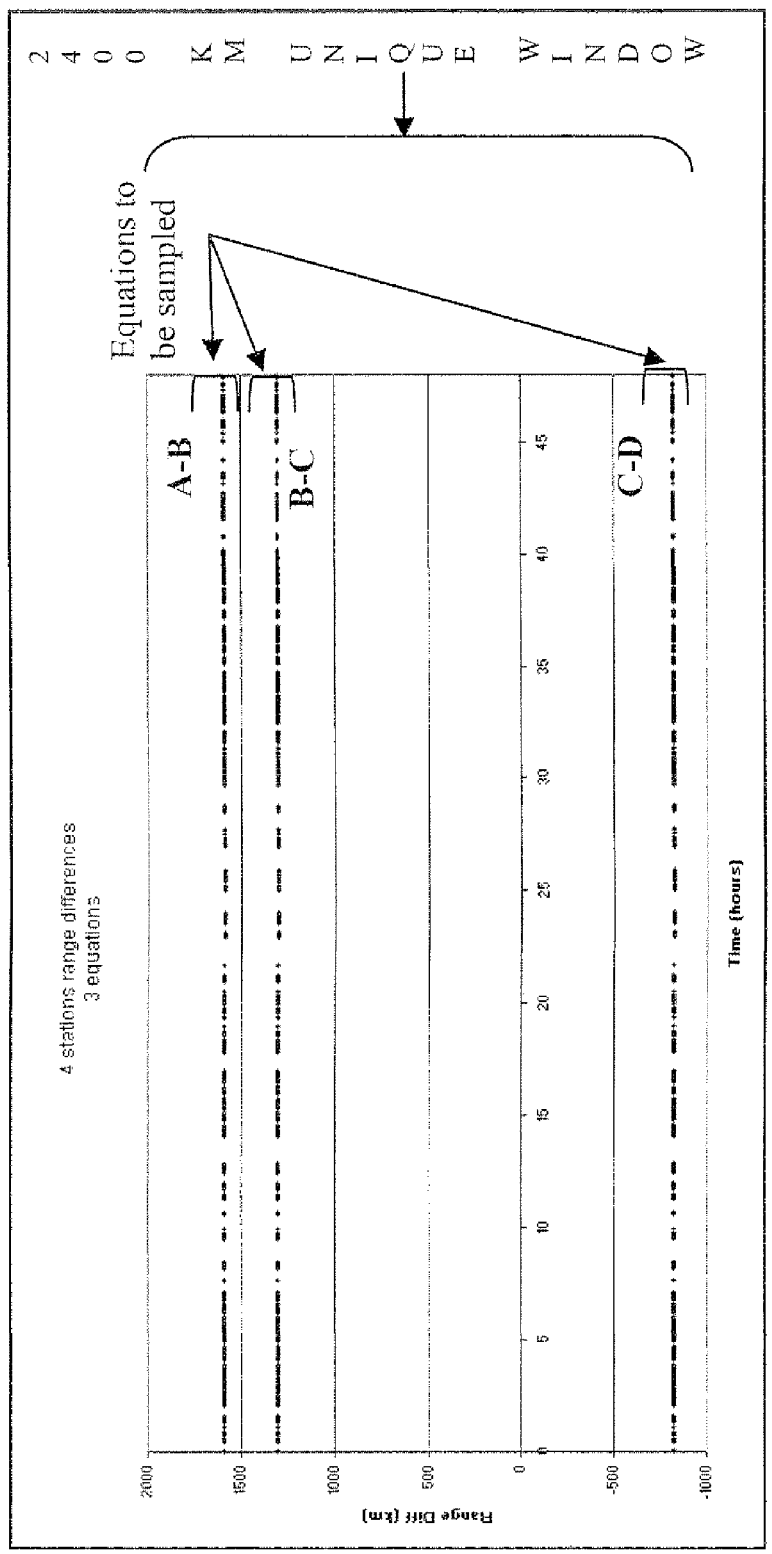
FIG. 6 shows an example of range differences associated with three pairs of receiving stations A–B, B–C, and C–D over a period of 48 hours to assist in understanding the problems associated with the recording window size.

Turning now to FIG. 6, the problems associated with the size of the recording window 8 will be further explained. FIG. 6 shows the range differences values and drift in a real system (samples are illustrated; this explains the intermittent character of the data). The system includes four receiving stations 4 (denoted herein A, B, C, and D) which record and time stamp a common signal broadcasted by a geostationary satellite.

The correlation process uses recording windows during which the receiving stations 4 sample incoming signals. Using a single, common recording window for all receiving stations, and therefore defining a common recording starting time and a common recording size (duration) is possible. However, using a single, common recording window for a satellite-based system generates implementation constraints due to the satellite-ground station signal propagation times (round trip distance approximately 77000 kilometers, round trip delay approximately 258 milliseconds). The implementation constraints include different frequency drifts during the recording time caused by Doppler effect (causing distortion which need to be palliated before the correlation), and high amount of sampled data to be transmitted to a central processing station. Using a single, common recording window is therefore unsatisfactory.

For illustration of both the problem and the solution proposed by the invention, a numerical example based on real collected data is here presented:
satellite located at 19.2E on the geostationary arc;
four receiving stations distributed in Europe in a 3000 kilometer baseline (Luxembourg, Stockholm, Rome and Madrid) under a pan European satellite beam; and
48-hour observation time.

In the example, a single, common recording window for all receiving stations would lead to approximately 2400 kilometers plus a 10 percent security margin, requiring a 9 millisecond long recording window. Using offset windows for every receiving station enables to reduce this required recording time for every station and thus external influences.

Figure 7A:
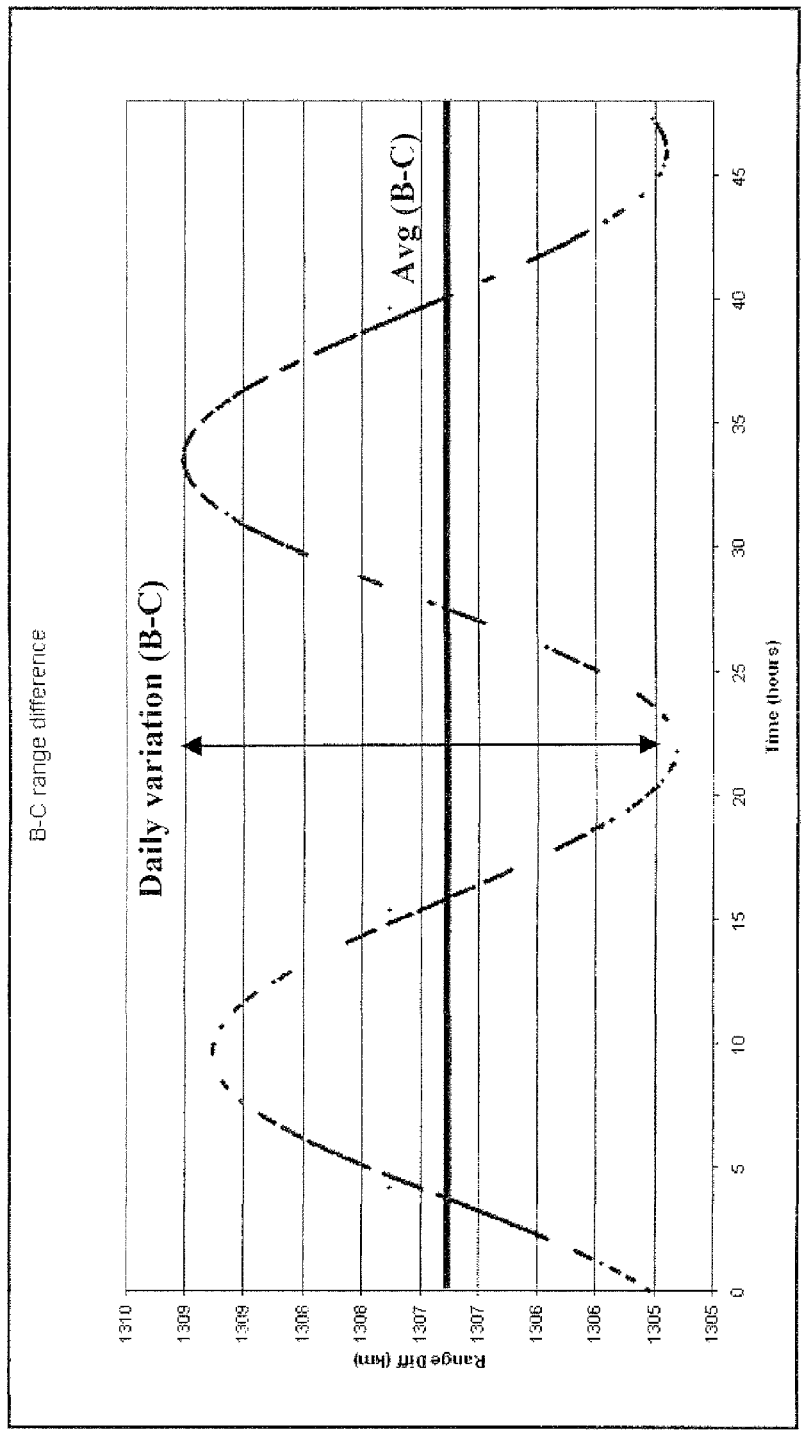
FIG. 7a shows an example of range differences between receiving stations B and C over 48 hours.
Figure 7B:
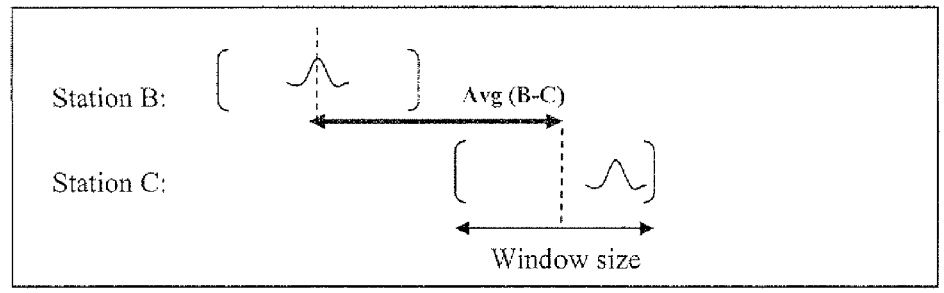
FIG. 7b shows examples of recording windows for two receiving stations B and C.

With reference to FIGS. 7a and 7b, the offset windows, and the location and size of the recording windows will be further explained. FIG. 7a shows the plot of the range difference between receiving stations B and C (in the example, a case with high daily variation) over 48 hours. The estimation of the average "Avg (B−C)" range difference determines the offset between the recording windows of receiving stations B and C. Since a daily pattern can be identified in a satellite movement (and in the range difference equation B−C), the size of the recording windows has to be determined in order to cover the daily variation of the equation around the average position.

FIG. 7b shows the recording windows for receiving stations B and C, the offset corresponding to Avg (B−C) and the window size. The window size is derived from:

Wind size=max (Daily variation, position estimation margin)+recording margin

The daily variation for this example is equal to 3.9 kilometer. The position estimation margin has to cover the possibility that the satellite moves out of the daily variation prediction (e.g. maneuver, other orbits than geostationary). In this example, and for two specific receiving stations (B and C), it can be shown geometrically that a satellite moving in a 200 kilometer cubic box on the geostationary arc, causes a maximum range difference of 20 kilometers between receiving stations B and C. An additional security recording margin has to be set to guarantee a sufficient signal overlap between a common portion of the satellite-transmitted signal for both windows. The minimal number of samples to reject false correlation peaks is estimated to 200 samples (4 milliseconds at 50 MHz sampling frequency) for a 25 MHz bandwidth signal. The window size is then:

$$\text{Window size [km]} = 20 + \left(\frac{200 \text{ samples}}{(f_s = 50 \text{ MHz})} \cdot c = 1.2 \text{ km}\right) = 21.2 \text{ Km}$$

Figure 8:
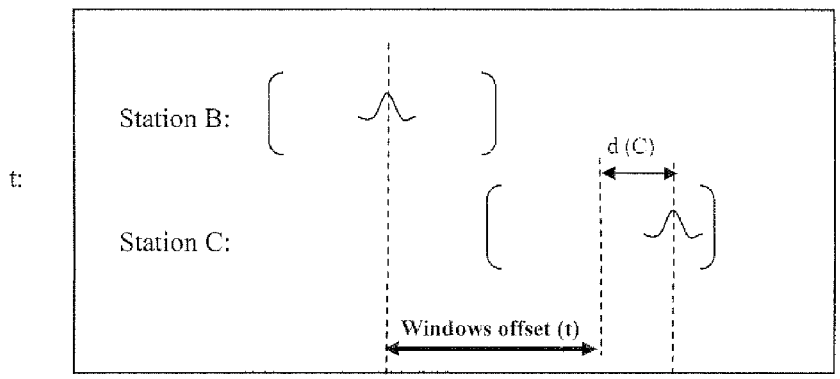
FIG. 8 shows examples of recording windows for two receiving stations B and C, at time t and t+1 in the context of a spacecraft position tracking system.
Figure 8:
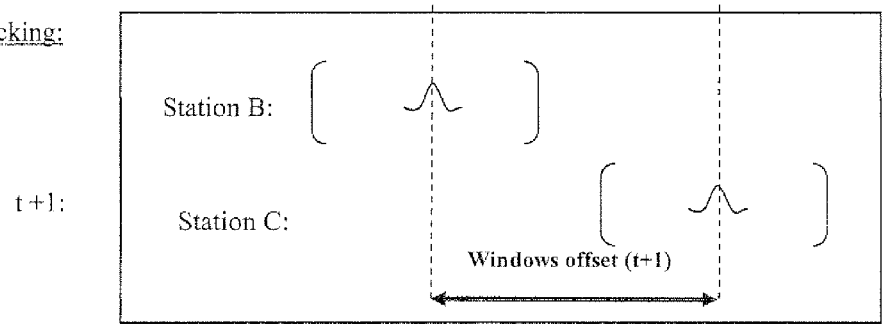

With reference to FIG. 8, the tracking will be further explained. The method according to one embodiment of the invention includes the process of tracking changes in the satellite position and in the range differences for a pair of receiving stations, for instance receiving stations B and C. For each iteration of the correlation of recording windows B and C, the correlation process outputs a peak at a specific "time shift" which is primarily used to calculate the satellite location. Secondarily, these "time shifts" are the inputs to the tracking system which determines a prediction of the next position and therefore the next offset between the recording windows associated with receiving stations and C.

The update of the window offset, at each iteration, maximizes the amount of overlapping signal between recording windows. Thus, the size of the recording windows can be reduced. The diagrams of FIG. 8 show, for illustrative purpose, the simplest prediction by an extrapolation of first order.

Finally, without direct reference to any drawings, the benefits of tracking, including especially the reduction of the recording window size for real-time systems, may be further explained as follows. The availability of a fine short-term prediction of the delay difference, based on past measurements has the advantage that the size of the recording windows no longer has to cover a daily pattern and may therefore be reduced. This reduction optimizes the amount of data to be transmitted on the network to a central processing station, to meet the needs of a real-time system.

The reduced recording window has to be able to track variations of the range difference equation in a second per second basis. Therefore, in addition to the minimal number (represented by symbol "#" in the equation below) of samples required to avoid signal ambiguity and false correlations (i.e. 200 samples or 4 milliseconds at 50 Mhz sampling frequency for a 25 Mhz bandwidth signal), the size of the recording window has to include an error margin in the estimation of the new position.

Recording window size=#samples to avoid ambiguity (200)+Estimation error margin

The equivalence between the error in the estimation of the new position and the number of additional samples required to cover it is calculated assuming a recording frequency ($f_s$) of 50 MHz and a worst-case estimation error of 1 meter:

$$\text{Estimation error margin} = 2 \cdot \left\lceil \frac{|Estimation_{error}|}{c} \cdot f_s \right\rceil =$$
$$2 \text{ samples} \Rightarrow \text{ size window} = 202 \text{ samples} = 1.21 \text{ Km}$$

As shown below in Table 1, a tracking system according to the invention may reduce external influences and data rates in a factor of 2000 compared to a unique window-based system.

TABLE 1

| | Techniques' performances | | |
|---|---|---|---|
| Aspect/technique | Unique window | Offset windows | Tracking |
| Signal to sample covering... | Offsets between 3 equations | Daily variation of 1 equation | Minimal number of samples to avoid ambiguities in signal |
| Window size | 2640 km | 21.2 km | 1.21 km |
| Data rate/second | 440 kB/station | 3.5 kB/station * | 202 B/station * |
| System data rate/second | 1.76 MB | 14 kB | 808 B |
| Gain | 1 | ~1/125 | ~1/2000 |

Note:
"Window size", "Data rate" and "System data rate" can be derived from each other by assuming 8 bit A/D and 50 MHz sampling frequency.
* The same recording window per receiving station (e.g. B) can be applied in all equations (e.g. A − B, B − C).

Where the term "unit" is used herewith (for instance in antenna unit 42, first receiving unit 44, recording unit 48, transmitting unit 49, second receiving unit 46, transmitting unit 22, receiving unit 24, correlating unit 26, offset and/or size calculating unit 28), no restriction is made regarding how distributed the constituent elements of a unit may be. That is, the constituent elements of a unit may be distributed in different software or hardware components or devices for bringing about the intended function. Furthermore, some of the units may be gathered together for performing their functions by means of a combined, single unit.

The above-mentioned units may be implemented using hardware, software, a combination of hardware and software, pre-programmed ASICS (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. System for estimating a spacecraft position, including:
 a plurality of receiving stations arranged to receive signals transmitted from the spacecraft; and
 a processing station arranged to receive data from the plurality of receiving stations;
 wherein
  each of the receiving stations is arranged to record, during a time window, herewith referred to as recording window, the signals transmitted from the spacecraft and to transmit, to the processing station, data representing the recorded signals during the recording window;
  the recording windows associated with each of the receiving stations are arranged to be offset and/or to be of different size with respect to each other; and
  the processing station is arranged to correlate the recorded signals to estimate, for each of at least one pair among the plurality of receiving stations, a distance difference between the spacecraft and each receiving station of the pair, and, based thereon, the spacecraft position.

2. System of claim 1, wherein the offset between the recording windows associated with two receiving stations and/or the size of each of the recording windows is arranged to be calculated based on
 information on the position of the spacecraft and/or the at least one distance difference, and
 the position of the two receiving stations.

3. System of claim 2, wherein the offset and/or the size is arranged to be calculated by the processing station.

4. System according to claim 1, for estimating and tracking the spacecraft position, wherein the offset between the recording windows associated with two receiving stations and/or the size of each of the recording windows is arranged to be calculated based on, or based further on, information on the spacecraft position and/or the at least one distance difference, as estimated by the processing station.

5. System of claim 4, wherein the offset and/or the size is arranged to be calculated between a first recording operation and a second recording operation based on the estimated spacecraft position and/or the at least one distance difference, derived from the first recording operation.

6. System of claim 1, wherein at least one of the receiving stations is located outside the main lobe downlink footprint of the spacecraft.

7. System of claim 1, wherein each recording window has a size comprised between 4 microseconds and 2 milliseconds.

8. Method for estimating a spacecraft position using a plurality of receiving stations arranged to receive signals transmitted from the spacecraft and a processing station arranged to receive data from the plurality of receiving stations, the method including:
 a recording and transmitting procedure including recording, by each of the receiving stations, during a time window, herewith referred to as recording window, the signals transmitted from the spacecraft and transmitting, by each of the receiving stations to the processing station, data representing the recorded signals during the recording window;
  wherein the recording windows associated with each of the receiving stations are offset and/or are of different size with respect to each other; and
 a correlating procedure including correlating, by the processing station, the recorded signals to estimate, for each of at least one pair among the plurality of receiving stations, a distance difference between the spacecraft and each receiving station of the pair, and, based thereon, the spacecraft position.

9. Method of claim 8, wherein the offset between the recording windows associated with two receiving stations and/or the size of each of the recording windows is calculated based on
 information on the position of the spacecraft and/or the at least one distance difference, and
 the position of the two receiving stations.

10. Method of claim 9, wherein the offset and/or the size is calculated by the processing station.

11. Method according to claim 8, for estimating and tracking the spacecraft position, wherein the offset between the recording windows-associated with two receiving stations and/or the size of each of the recording windows is calculated based on, or based further on, information on the spacecraft position and/or the at least one distance difference, as estimated by the processing station.

12. Method of claim 11, wherein the offset and/or the size is calculated between a first recording operation and a second recording operation based on the estimated spacecraft position and/or the at least one distance difference, derived from the first recording operation.

13. Method of claim 8, wherein at least one of the receiving stations is located outside the main lobe downlink footprint of the spacecraft.

14. Method of claim 8, wherein each recording window has a size comprised between 4 microseconds and 2 milliseconds.

15. Receiving station for participating in estimating a spacecraft position, comprising:
- a first receiver arranged for receiving signals transmitted from the spacecraft;
- a second receiver arranged for receiving, from a processing station, a trigger time indication as an instruction to a start of a time window and/or a window size indication as an instruction to a size of the time window;
- a recorder arranged for recording, during a time window started according to the received trigger time indication and/or window size indication, the signals transmitted from the spacecraft, the time window being herewith referred to as recording window; and
- a transmitter arranged for transmitting, to the processing station, data representing the recorded signals during the recording window.

16. Receiving station of claim 15, located outside the main lobe downlink footprint of the spacecraft.

17. Processing station for participating in estimating a spacecraft position, comprising:
- a transmitter arranged for transmitting, to each of a plurality of receiving stations arranged to receive signals transmitted from the spacecraft, a trigger time indication referring to the start of a time window, herewith referred to as recording window, and/or a window size indication as an instruction to a size of the recording window;
- a receiver arranged for receiving, from each of the plurality of receiving stations, data representing recorded signals transmitted from the spacecraft during the recording window;
  wherein the recording windows associated with each of the receiving stations are arranged to be offset and/or to be of different size with respect to each other; and
- a correlator arranged for correlating the recorded signals to estimate, for each of at least one pair among the plurality of receiving stations, a distance difference between the spacecraft and each receiving station of the pair, and, based thereon, the spacecraft position.

18. Processing station of claim 17, wherein the offset between the recording windows associated with two receiving stations and/or the size of each of the recording windows is arranged to be calculated by the processing station based on
- information on the position of the spacecraft and/or the at least one distance difference, and
- the position of the two receiving stations.

19. Processing station of claim 17, for estimating and tracking the spacecraft position, wherein the offset between the recording windows associated with two receiving stations and/or the size of each of the recording windows is arranged to be calculated by the processing station based on, or based further on, information on the spacecraft position and/or the at least one distance difference, as estimated by the processing station.

20. Processing station of claim 19, wherein the offset and/or size is arranged to be calculated between a first recording operation and a second recording operation based on the estimated spacecraft position and/or the at least one distance difference, derived from the first recording operation.

21. Processing station of claim 17, wherein each recording window has a size comprised between 4 microseconds and 2 milliseconds.

22. Computer program configured, when executed on a receiving station or on a processing station, to carry out the receiving station specific procedures or the processing station specific procedures respectively of the method according to claim 8.

* * * * *